(12) United States Patent
Kamruddin

(10) Patent No.: US 8,600,858 B1
(45) Date of Patent: Dec. 3, 2013

(54) DETERMINING FINANCIAL SENTIMENT BASED ON CONTESTS

(76) Inventor: Fahad Kamruddin, Seattle, WA (US)

( * ) Notice: Subject to any disclaimer, the term of this patent is extended or adjusted under 35 U.S.C. 154(b) by 0 days.

(21) Appl. No.: 13/475,772

(22) Filed: May 18, 2012

Related U.S. Application Data

(60) Provisional application No. 61/460,758, filed on May 18, 2011, provisional application No. 61/568,453, filed on Dec. 8, 2011.

(51) Int. Cl.
  *G06Q 40/00* (2012.01)
(52) U.S. Cl.
  USPC .............................. 705/35; 705/36 R; 705/37
(58) Field of Classification Search
  USPC ........................................... 705/35, 36 R, 37
  See application file for complete search history.

(56) References Cited

U.S. PATENT DOCUMENTS

| | | | |
|---|---|---|---|
| 7,359,876 B1 * | 4/2008 | Redpath et al. ................. | 705/37 |
| 2001/0034683 A1 * | 10/2001 | Ren ................................ | 705/35 |
| 2006/0218179 A1 * | 9/2006 | Gardner et al. ................. | 707/102 |
| 2007/0011073 A1 * | 1/2007 | Gardner et al. ................. | 705/35 |
| 2007/0162365 A1 * | 7/2007 | Weinreb .......................... | 705/35 |
| 2007/0233585 A1 * | 10/2007 | Ben Simon et al. ............ | 705/35 |
| 2010/0280976 A1 * | 11/2010 | Carpenter et al. ............. | 705/500 |

\* cited by examiner

*Primary Examiner* — Lalita M Hamilton

(57) ABSTRACT

A system and a method are disclosed for classifying items of social media content and for determining sentiment. In one embodiment, an item of social media content is obtained. The item may have been generated by a user participant of a forecasting contest. Thereafter, a financial classification for the item of social media content is determined based on a social media message packet of the item of social media content. Subsequently, a polarity for the item of social media content is determined based on the social media message packet of the item of social media content. In addition, a reliability score for a user that generated the item of social media content is determined. Based on the determined polarity, determined financial classification, and determined reliability score, financial sentiment for a financial instrument associated with the item of social media content is determined.

17 Claims, 19 Drawing Sheets

Google Inc. (GOOG)  628.92  +17.82 (2.92%)

| Overview | Social Momentum | Fundamentals | Analyst Estimates | Relative Risk |
|---|---|---|---|---|

Financial Strength 400.00  Profitability 317.22  Peer Relative Return 0.13

Financial Metrics

| Statistic | Value | Peer Group |
|---|---|---|
| Equity to Debt | 11.31 | null |
| Cash Flow to Debt | 20.00 | null |
| Ebitda to Debt | 20.00 | null |
| Fixed Charge Coverage | 20.00 | null |
| Self Financing | 2.37 | null |

Profitability Metrics

| Statistic | Value | Peer Group |
|---|---|---|
| Average ROE | 0.17 | null |
| Cash Flow to Working Assets TTM | 0.55 | null |
| Return on Assets Fwd | 0.19 | null |
| Return On Equity Fwd | 0.23 | null |
| Sustainable Growth Rate TTM | 0.17 | null |

Peer Group

| Stock | Quality | Value | Risk |
|---|---|---|---|
| BIDU | 1.5 | -1.61 | -1.39 |
| NTES | 1.25 | 1.01 | 0.57 |
| GOOG | 0.51 | 0.96 | 0.71 |
| EBAY | -0.4 | -0.14 | 0.7 |
| YHOO | -0.79 | 1 | 1.4 |

Latest Headlines
--Google revamps U.S. search (Quality vs Value scatter plot showing BIDU, NTES, EBAY, GOOG, VRSN, AKAM, YHOO)

| Market Pulse | Technicals | Trades |
|---|---|---|
| $GOOG If Google can do it why can't Facebook? | $GOOG HVF Breakout brewing... | @cnbcfastmoney Stay Long $GOOG above $620... |

FIG. 8D

Google Inc. (GOOG)   628.92   +17.82 (2.92%)

| Overview | Social Momentum | Fundamentals | Analyst Estimates | Relative Risk |

Average Rating Buy   Momentum 134.00

Price chart Jul'11 – Apr'12 with EPS markers: EPS 8.44, EPS 8.35, EPS 8.88; axis values 500, 600, 8.5, 8.75; markers B, B, H, B.

Snapshot

| | |
|---|---|
| Number of EPS Estimates — This Year | 37.00 |
| Estimated EPS — This Year (FC) | 22.81 |
| Estimated EPS — Next Year (FC) | 26.45 |
| EPS Up Revisions — Last 30 Days (FC) | 2.00 |
| EPS Revisions Down — Last 30 Days | 0.00 |
| EPS Change TTM | 0.24 |

Estimate Feed

| Date | Firm | Rating |
|---|---|---|
| Dec 7 2011 | Canaccord | Buy |
| Oct 5 2011 | Stifel Nicolaus | Hold |
| Aug 15 2011 | Hilliard Lyons | Buy |
| July 6 2011 | Collins Stewart | Buy |
| Jan 19 2011 | ISI Group | Hold |

Peer Group

| Stock | Quality | Value | Risk |
|---|---|---|---|
| BIDU | 1.5 | -1.61 | -1.39 |
| NTES | 1.25 | 1.01 | 0.57 |
| GOOG | 0.51 | 0.96 | 0.71 |
| EBAY | -0.4 | -0.14 | 0.7 |
| YHOO | -0.79 | 1 | 1.4 |

Latest Headlines

...Google revamps U.S. search...

Android Platform Could Drive Google...

Knowledge Graph: Google's New Take...

Market Pulse

$GOOG If Google can do it why can't Facebook?

Technicals

$GOOG HVF Breakout brewing...

Trades

@cnbcfastmoney Stay Long $GOOG above $620...

*FIG. 8E*

| | Level of Completed Picks | Level of Clout | External Reputation |
|---|---|---|---|
| User 1 | 1 | 1 | 1 |
| User 2 | 1 | 2 | 1 |
| User 3 | 2 | 3 | 2 |
| User X | 2 | 4 | 3 |

*FIG. 11*

| | Level of Net Gain | Level of Clout | Level of Accuracy | Internal Rank |
|---|---|---|---|---|
| User 1 | 11.7% | 1 | 80% | 1 |
| User 2 | 13.4% | 2 | 47% | 3 |
| User 3 | 9.7% | 2 | 68% | 2 |
| User X | 3.1% | 4 | 38% | 4 |

*FIG. 12*

DETERMINING FINANCIAL SENTIMENT BASED ON CONTESTS

CROSS REFERENCES TO RELATED APPLICATIONS

This application claims the benefit of U.S. Provisional Application No. 61/460,758 filed May 18, 2011 and U.S. Provisional Application No. 61/568, 453 filed Dec. 8, 2011, each of which is incorporated by reference in its entirety.

BACKGROUND

1. Field of Art

The disclosure generally relates to the field of organizing financial information and providing financial forecasting.

2. Description of the Related Art

Social media channels have grown rapidly in recent years. Such channels often include voluminous amounts of information generated by its users. For instance, large amounts of financial content are currently accessible over STOCIAL.COM, TWITTER, FACEBOOK, GOOGLE+, etc. Such financial content often includes relevant information for determining the trends of various financial markets and instruments. However, because such financial content is often unfiltered and unstructured, investors and investment firms frequently struggle to make sense of the content. As a result, such investors and investment firms are unable to make intelligent and rapid investment decisions.

BRIEF DESCRIPTION OF DRAWINGS

The disclosed embodiments have other advantages and features which will be more readily apparent from the detailed description, the appended claims, and the accompanying figures. (or drawings). A brief introduction of the figures is below.

FIGS. 8A-8F each illustrates an embodiment of an exemplary user interface.

FIG. 11 illustrates a diagram showing one embodiment of the manner in which the external reputations of users are associated with levels of clout and completed picks.

FIG. 12 illustrates a diagram showing one embodiment of the manner in which the internal ranks of users are associated with net gain metrics, levels of clout, and levels of accuracy.

DETAILED DESCRIPTION

Figure 1:
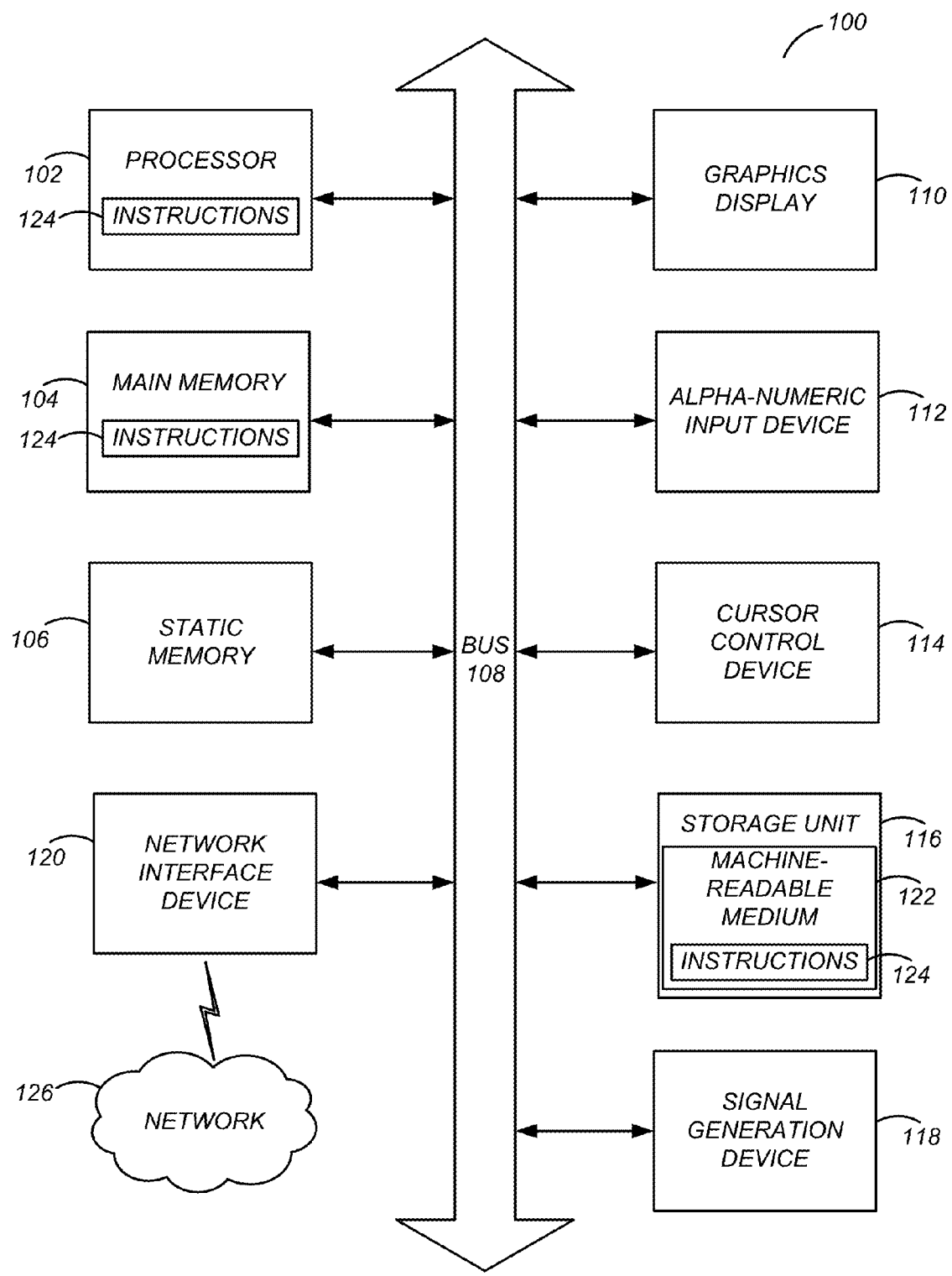
FIG. 1 (figure) illustrates one embodiment of components of an example machine able to read instructions from a machine-readable medium and execute them in a processor (or controller).

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes classifying items of social media content and determining financial sentiment based on the classified items. In one embodiment, relevant items of social media content are automatically classified into one or more financial categories. For example, the content items may be assigned into at least one of the following categories: technical patterns, trades, breakout, earnings, ratings, market pulse, and setup (long or short). By classifying content items in this manner, social media content discussing financial instruments, groups of financial instruments, financial sectors, financial sub-sectors, industries, sub-industries, and/or financial markets can be broken down into easily digested units for a viewing user (e.g., an investor, an analyst, a financial reporter, end user, etc.).

In one embodiment, financial sentiment information for each of one or more financial instruments (e.g., stocks, bonds, mutual funds, etc.), groups of financial instruments, financial sectors, financial sub-sectors, industries, sub-industries, and/ or financial markets can be derived. The financial sentiment information can indicate the overall perception of a particular financial instrument, group of financial instruments, financial sector, financial sub-sector, industry, sub-industry or financial market as indicated by the content items received from various social media channels. For example, the financial sentiment for a particular stock may include a percentage of social media users that have a positive perception of the stock and a percentage of social media users that have a negative perception of the stock. Illustratively, the financial sentiment for the stock may indicate that 25% of social media users have a positive perception of the stock and 75% of social media users have a negative perception of the stock.

The financial sentiment information can be derived in any suitable manner. In one embodiment, the polarities/directions for one or more of the content items are determined. Reliability scores can be further computed for the creators of the content items. Based on the determined item classifications, polarities/directions, and associated reliability scores, sentiment information for one or more financial instruments, groups of financial instruments, financial sectors, financial sub-sectors, industries, sub-industries, and/or financial markets can be derived. For ease of understanding in the following description, the term financial instrument may be used to collectively refer to one or more financial instruments, groups of financial instruments, financial sectors, financial sub-sectors, financial industries, financial sub-industries and/or financial markets.

By classifying social media content items and determining sentiment information based on the content items, the embodiment enables the effective separation of financial sentiment signals from social media noise. For example, information important to financial sentiment can be separated from irrelevant or unimportant information. The information important to financial sentiment can additionally be organized in a logical manner. As a result, the embodiment can provide relevant and easily consumed information regarding the current states of financial instruments. The embodiment can additionally provide relevant and easily consumed information regarding the futures states of the same. Viewing users, presented with such information, can thus make quicker and better informed investment decisions.

In one embodiment, at least some of the social media content items used to determine sentiment are obtained by holding one or more forecasting contests. Such social media content items may be referred to as transaction content. In each forecasting contest, users may make picks with respect to a specific financial instrument. The picks may provide estimates as to the future performance of the financial instrument. Illustratively, a contest may be held for GOOGLE INC.'s stock. In the contest, one or more users may make picks that estimate the future performance of the stock.

After the picks for the contest are received from users, the picks are monitored based on real market data to determine their accuracy. The picks and/or other related information may be used, in part, to determine the overall sentiment of various financial instruments.

Computing Machine Architecture

Referring to Figure (FIG. 1, a block diagram illustrates components of an example machine able to read instructions from a machine-readable medium and execute them in a processor (or controller). In one embodiment, the instructions correspond to the processes described herein. Continuing, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes one or more processors 102 (e.g., one or more central processing units (CPUs), graphics processing units (GPUs), digital signal processors (DSPs), application specific integrated circuits (ASICs), radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a cache memory of the processor) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System for Classifying Social Media Content and Determining Sentiment

Figure 2:
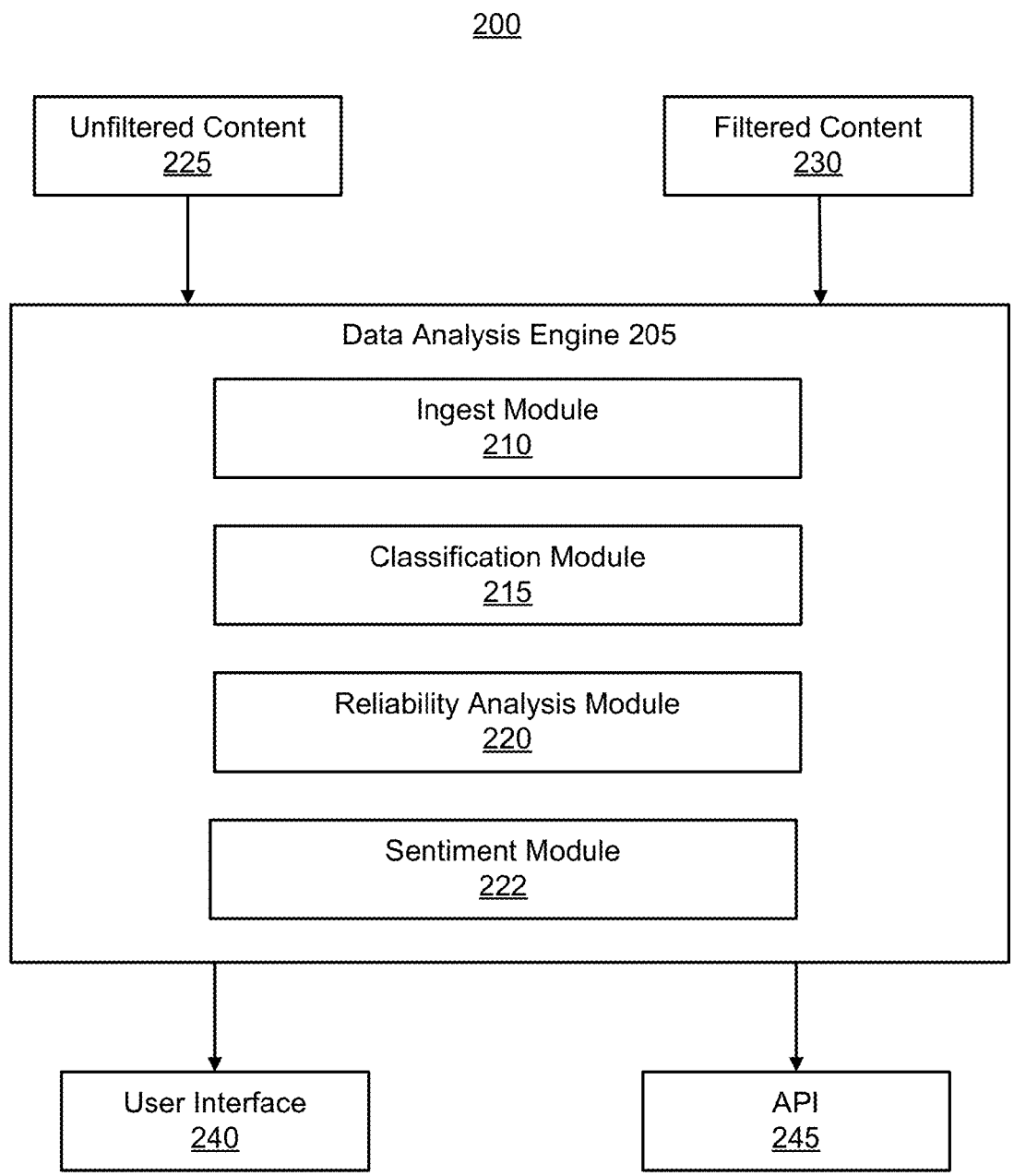
FIG. 2 illustrates one embodiment of various components for a system configured to classify items of social media content and determine financial sentiment.

Turning now to FIG. 2, it illustrates various components for a system 200 configured to classify items of social media content and determine financial sentiment based on the classified content items. The system 200 may be configured to execute described processes within the computer system 100. As shown in FIG. 2, the system 200 includes a data analysis engine 205. The data analysis engine 205 includes four modules: an ingest module 210, a classification module 215, a reliability analysis module 220, and a sentiment module 222. In one embodiment, the data analysis engine 205 receives one or more social media content streams from one or more social media channels (e.g., TWITTER, STOCIAL.COM, FACEBOOK, GOOGLE+, etc.). As shown in FIG. 2, the social media content streams can include the unfiltered content streams 225 (e.g., content from TWITTER) and the filtered content streams 230 (e.g., data from STOCIAL.COM).

Upon receiving the social media content streams, the data analysis engine 205 classifies at least some of the items of social media content in the streams and derives sentiment information for one or more financial instruments based on the classified items. The classified items of social media content and derived sentiment information can be provided for display to a user via a user interface. For example, as shown in FIG. 2, classified items and derived sentiment information can be displayed on the user interface 240. The data analysis engine 205 can additionally or alternatively output the classified items and derived sentiment information via an application programming interface 245 (API).

In order to classify social media content items and derive sentiment information, the modules 210, 215, 220, and 222 of the data analysis engine 205 can perform various processes. In particular, the ingest module 210 can perform a process for cleaning received items of social media content (e.g., items of TWITTER data) from the unfiltered content streams 225 (e.g., data streams from the TWITTER service). In one embodiment, the items of the streams 225 may be cleaned if at least some of the items in the stream are not suitable for classification and sentiment determination. For example, a particular unfiltered content stream may include items that are not relevant to determining financial sentiment. Illustratively, content corresponding to where users are meeting for a dance event or what users are currently dining upon would be filtered out to leave content corresponding to sales or earnings data. As a result, the stream may be filtered of the irrelevant items.

The classification module 215 can perform a process for classifying received items and determining the polarities and/or directions for the items. The reliability analysis module 220 can perform a process for assigning reliability scores to the creators of the received items of social media content. The sentiment module 222 can compute financial sentiment information for one or more financial instruments. The sentiment module 222 can further output the financial sentiment information and/or the content of classified content items. Further details regarding the processes performed by the various modules of the data analysis engine 205 are discussed in greater detailed below.

Process for Classifying Social Media Content and Determining Sentiment

Next, FIGS. 3 through 7 collectively illustrate processes usable for classifying social media content items and deriving sentiment information based on content streams received from various social media channels. The processes are executable in, for example, a system such as the computer system 100. For clarity and ease of understanding, the processes shown in FIGS. 3 through 7 illustrate the processing performed on an individual item of social media content in the streams. However, it should be appreciated that in normal use the processes shown in FIGS. 3 through 7 may process thousands or millions of items of social content from the streams in order to determine sentiment information.

Data Ingest Processing

Figure 3:
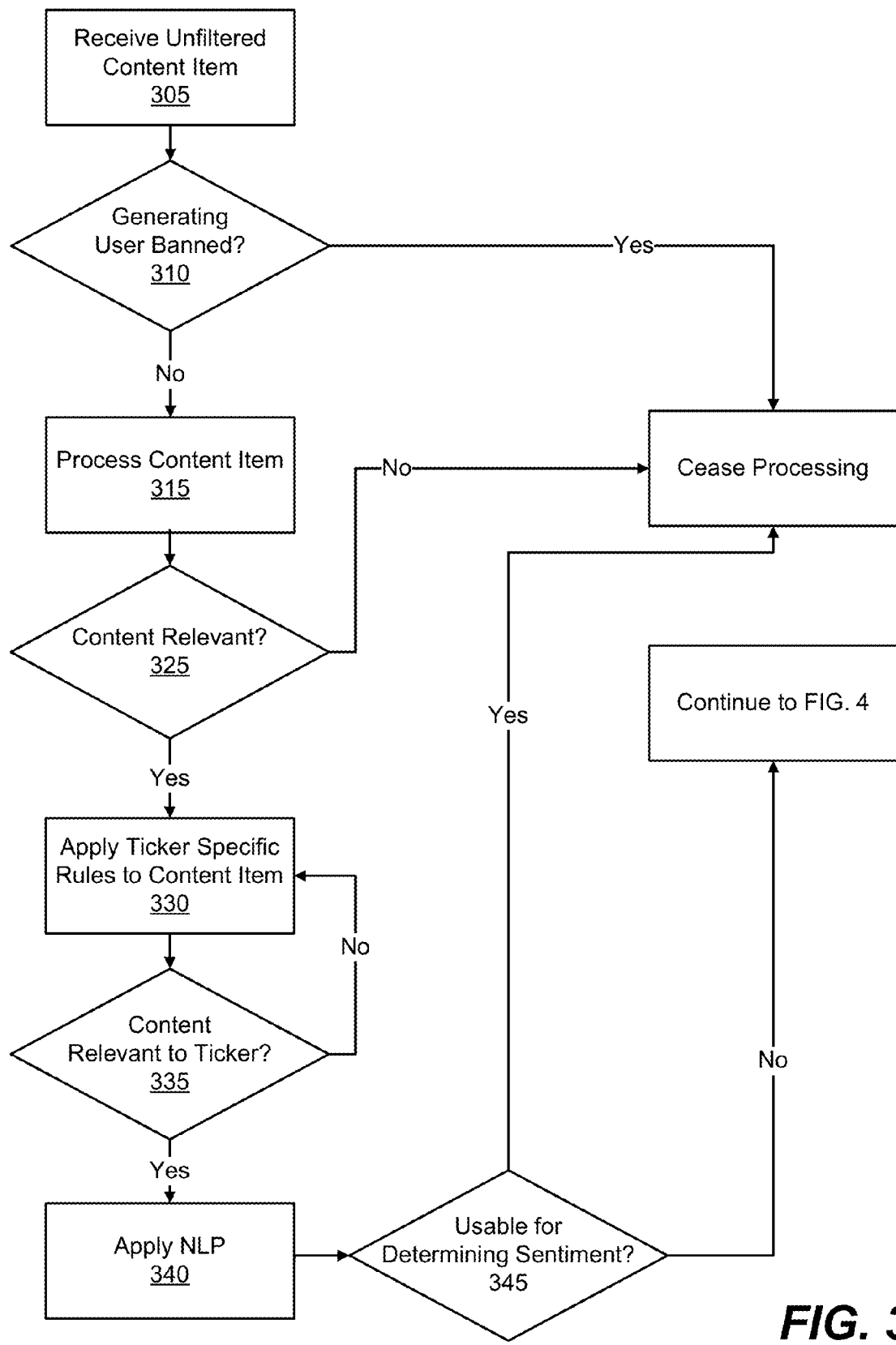
FIG. 3 illustrates one embodiment of a process for cleaning an item of social media content.

As discussed, the ingest module 210 cleans a stream of unfiltered social media content received from various social media channels. In particular, the ingest module 210 can identify relevant social media content items in the stream that can be used to determine financial sentiment. Referring to FIG. 3, a process for cleaning an item of social media content from a stream is illustrated.

As shown in FIG. 3, the process begins with the ingest module 210 receiving 305 an item of social media content from an unfiltered content stream (e.g., an item of TWITTER data in a TWITTER stream). The item of social media content can include the content of a social media message packet (e.g., a tweet) and/or other associated metadata (e.g., identification information for the creator of the social media message packet, etc.). Upon receiving the item of social media content, a determination 310 is made as to whether the creator of the social media message packet included in the item has been banned. For example, it may have been previously determined that the creator of the item routinely provides misleading content. As such, items of social media content generated by the creator may be discarded.

If the creator has not been banned, the item of social media content is further processed 315 by the ingest module 210. In further processing the item, the ingest module 210 performs a check to determine whether the social media message packet of the item has been forwarded (e.g., re-tweeted). If the social media message packet has been forwarded, the ingest module 210 increases a social media message packet count for the item. The social media message packet count may be used later to determine whether the content of the social media message packet should be presented to a user in the user interface 240. The ingest module 210 may perform such a determination in any suitable manner. For example, the ingest module 210 can determine whether a social media message packet has been forwarded by checking the metadata for the item.

In processing the item of social media content, the ingest module 210 further determines whether a link (e.g., a universal resource locator) included in the social media message packet has been previously included in other social media message packets. The ingest module 210 may perform such a check in any suitable manner. For example, the ingest module 210 may reference a database storing the links included in the various social media message packets of the various content items received by the ingest module 210. If the link has been previously included in other social media message packets, the social media message packet count for the item can be increased. In doing so, a social media message packet that includes a relatively popular or relevant link may be more likely to be presented to a user in the user interface 240.

In one embodiment, the ingest module 210 thereafter determines 325 the relevancy of any content and links included in the social media message packet of the item of social media content. More specifically, the ingest module 210 can check the content of the social media message packet to determine whether the social media message packet includes any words relevant to the determination of financial sentiment. For example, the ingest module can determine whether the social media message packet includes any stock ticker symbols ("tickers"), terms or term combinations indicative of a particular company (e.g., the combination of the terms "Amazon" and "online retailer"), etc. The ingest module 210 may make such a determination in any suitable manner. For example, the ingest module 210 may reference a financial terms lexicon in order to determine whether the words in the social media message packet are relevant for determining sentiment.

The ingest module 210 can additionally check whether any links (e.g., universal resource locators, etc.) included in the social media message packet reference websites determined to be relevant for determining sentiment. For example, the ingest module 210 may determine that a link in a social media message packet is relevant if the link references a known investment website. In contrast, the ingest module 210 may determine that a link is not relevant if the link references a known classifieds advertising website. The ingest module 210 may make such a determination in any suitable manner. For example, the ingest module 210 may reference a database of relevant websites in order to determine whether a link included in the social media message packet is relevant for determining sentiment. In one embodiment, if the content and/or the links included in a social media message packet are determined not to be relevant, the ingest module 210 discards the item of social media content. As a result, the item is not processed further.

If an item of social media content is determined to include relevant content and/or links, the ingest module 210 applies 330 a set of ticker specific rules to determine a specific financial instrument associated with the item of social media content. The ingest module 210 may perform such a determination in any suitable manner. In one embodiment, the ingest module 210 may initially identify a tag embedded in the social media message packet of the item of social media content. Based on the identified tag, the ingest module 210 may identify a ticker symbol matching the tag by referencing a database of ticker symbols for various financial instruments.

After identifying a ticker symbol, the ingest module 210 determines 335 whether the subject of the social media message packet of the item is relevant to the entity associated with the identified ticker symbol. Determination of the relevance of the content can be based on rules specific to the identified ticker symbol. In one embodiment, the rules may indicate a set of terms associated with the identified ticker symbol and/or a set of terms not associated with the identified ticker symbol. In determining relevance, the ingest module 210 may compare the words of the social media message packet against the terms listed in the ticker's rules.

If, based on the rules, the determined subject is relevant to the identified ticker symbol, a financial instrument related to the identified ticker symbol can be determined to be associated with the item of social media content. Thereafter, processing of the item of social media content can continue. If the determined subject is not relevant to the associated ticker symbol, the ingest module 210 may, in one embodiment, attempt to identify another ticker symbol for the item of social media content. If a ticker symbol relevant to the social media message packet cannot be ultimately identified, the ingest module 210 may discard the item of social media content. In such an instance, processing of the item of social media content ceases.

As an example, the social media message packet of an item may include the tag "SA." The ingest module 210 may associate such a tag with the ticker symbol for the company "Agilent Technologies." Thereafter, the ingest module 210 may process the text of the social media message packet, and determine that the text discusses the Australian dollar. In particular, the ingest module 210 may determine that the text of the social media message packet includes terms indicative of a discussion regarding the Australian dollar. In such an embodiment, the ingest module 210 may determine that the subject of the social media message packet is not relevant to the company "Agilent Technologies." As a result, the ingest module 210 may attempt to match the tag in the social media message packet to another ticker symbol. If a ticker symbol relevant to the social media message packet cannot be found, the item of social media content is discarded, and not further processed.

If a financial instrument for the item of social media content is identified, the ingest module 220 processes 340 the social media message packet of the item by employing a natural language processor (NLP). In one embodiment, the natural language processor may be implemented using a suitable Bayesian algorithm. In the embodiment, the Bayesian algorithm may leverage information for previously processed items of social media content. More specifically, the natural language processor may have been trained using a set of sample social media message packets provided by an operator of the data analysis engine 205.

In one embodiment, the NLP determines 345 whether the social media message packet includes information usable for determining sentiment. If the social media message packet includes usable information, processing of the item of social media content can continue to classification processing and polarity/direction determination. If the social media message packet does not include usable information, processing of the item of social media content ceases.

Classification Processing and Polarity/Direction Determination

Figure 4:
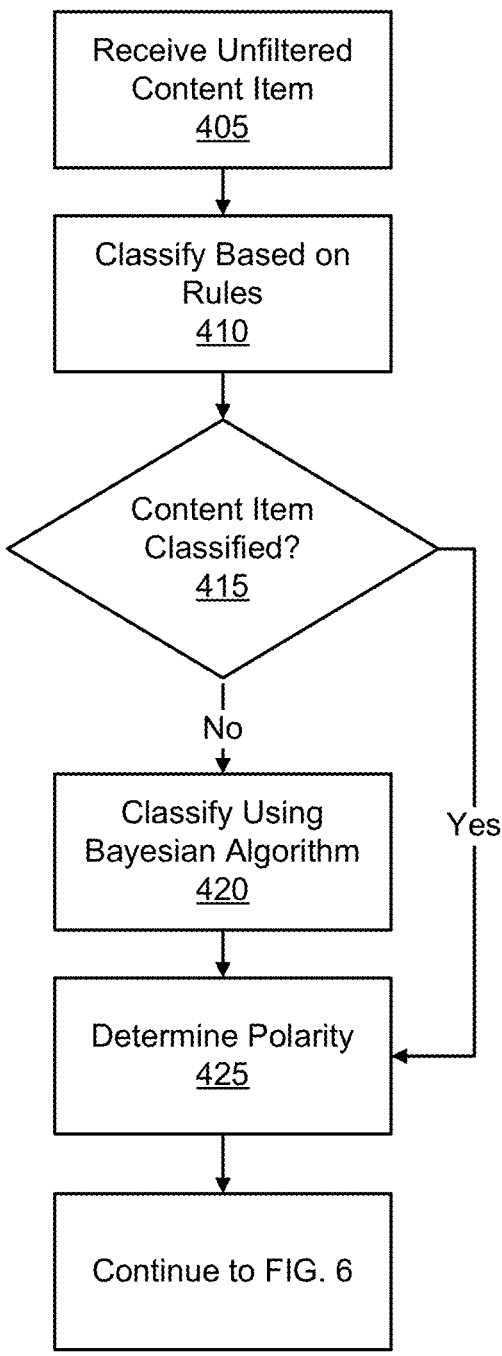
FIG. 4 illustrates one embodiment of a process for classifying and determining the polarity of an item of social media content.

As discussed, the classification module 215 can perform a process for classifying items of social media content and determining the polarities/directions for the items. Referring to FIG. 4, a process for classifying an item of social media content and determining the polarity for an item is illustrated. In some instances, the item to be classified may have been previously cleaned by the process shown in FIG. 3. In other instances, the item may not have been previously cleaned because the item was received in a filtered content stream (e.g., a stream from the STOCIAL.COM service).

As illustrated in FIG. 4, the process begins with the classification module 215 receiving 405 an item of social media content (e.g., an item of TWITTER data). After receiving the item of social media content, the classification module 215 applies 410 a set of classification rules to classify the item of social media content. The classification rules can be used to classify the item of social media content into one or more financial categories. For example, the classification rules may be used to classify the item of social media content into one of a technical pattern, trade, breakout, earnings, ratings, market pulse, or setup (long or short) category. In one embodiment, the classification module 215 applies rules to a social media message packet of the item of social media content. In particular, the rules can specify terms that are indicative of certain classification categories. For example, the rules may specify that the term "head and shoulders" is associated with the technical pattern category. In applying the rules, the classification module 215 can determine whether the social media message packet includes any terms indicative of a category for the item of social media content. If a term for a particular category is identified, the classification module 215 assigns the item of social media content to the category.

In one embodiment, the classification module 215 determines 415 whether the item of social media content can be classified using the rules. If a classification for the item of social media content cannot be determined using the rules, the classification module 215 applies 420 a Bayesian algorithm to determine the classification. In particular, the Bayesian algorithm may include a set of classification filters usable for identifying a financial category for the item of social media content. The filters may include a technical pattern filter, a trade filter, a breakout filter, an earnings filter, a ratings filter, a market pulse, a setup (long or short) filter. The classification module 215 can apply the filters to the social media message packet of the item of social media content in order to determine a financial category for the content item. In the embodiment, the Bayesian algorithm may leverage information for previously processed items of social media content. In one embodiment, the Bayesian algorithm may have been previously trained by an operator of the data analysis engine 205 using sample social media message packets.

Upon determining the classification for the item of social media content, the classification module 215 determines 425 a polarity for the item of social media content. As used herein, the polarity of an item can be a value that measures the relative bullishness or bearishness of the item of social media content with respect to the financial instrument determined to be associated with the item. In one embodiment, determination of the polarity of the item can be performed using a set of polarity rules. In particular, the set of polarity rules can identify terms that tend to indicate polarity. For example, the set of polarity rules can include information specifying that the phrase "long on stock X" indicates that a particular social media message packet includes a positive polarity with respect to the stock X.

In one embodiment, the set of polarity rules can also indicate a polarity strength for each term. For example, a first term may have a high polarity strength relative to another term if the first term indicates a high bullishness for a financial instrument while the other term indicates a mild bullishness for the term. Based on the rules, the classification module 215 can determine an overall polarity for the item by considering the polarity strength of each term or combinations of terms of the item. For example, the overall polarity of the item can be computed by summing the polarity strengths of the terms of the item and dividing the sum by the number of terms. Illustratively, a social media message packet of an item of social media content may include three terms. The first term may have a positive polarity of 0.2, the second term may have a positive polarity of 0.5, and the third term may have a negative polarity of −0.1. The classification module 215 may sum the polarities and thereafter divide the sum by 3 to obtain a polarity of 0.2 for the item.

In one embodiment, if the polarity of a particular item of social media content cannot be determined using the set of polarity rules, the classification module 215 applies a Bayesian algorithm for determining polarity. In the embodiment, the Bayesian algorithm may leverage information for previously processed items of social media content to determine the polarity of the item of social media content. In one embodiment, the Bayesian algorithm may have been trained using sample social media content items provided by an operator of the data analysis engine 205.

Figure 5:
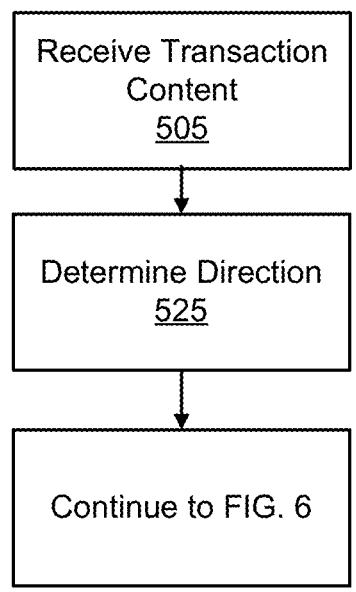
FIG. 5 illustrates one embodiment of a process for determining the direction of an item of social media content.

FIG. 5 shows a process for determining the direction of an item of transaction content. The process begins by receiving 505 an item of transaction content. The item of transaction content may be received in a filtered content stream. The item of transaction content may further be received from a suitable source, such as the contest system 960. The item of transaction content may be, for example, derived from a forecasting contest held by the contest system 960. Illustratively, the item of transaction content may be a contest pick received from a user participating in the forecasting contest. After receiving the item of transaction content, the process 510 determines a direction indicated by the item. The direction of the item of transaction content can be determined in any suitable manner. For example, a particular user participant may provide a pick that indicates a buy price for a particular stock of $48.00. The price of the stock may be currently at $50.00. As a result, the classification module 215 may determine that the direction of the pick is negative. In one embodiment, the classification module 215 may additionally determine a direction strength for the item of transaction content. In one embodiment, the classification module 215 may determine direction, based on a set of direction rules and/or a Bayesian algorithm for determining direction. The set of direction rules and/or the Bayesian algorithm for determining direction can be similar to the set of rules and/or Bayesian algorithm used for determining polarity.

Reliability Score Assignment

Figure 6:
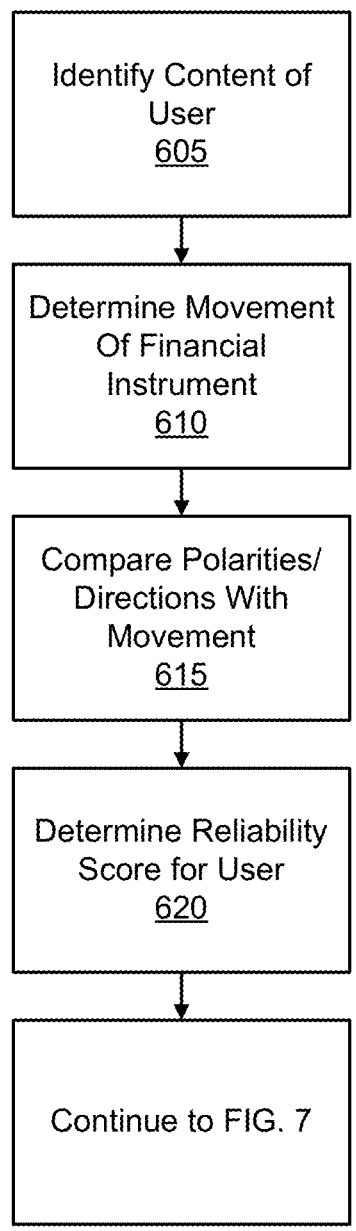
FIG. 6 illustrates one embodiment of a process for determining a reliability score for a creator of an item of social media content.

As discussed, the reliability analysis module 220 can perform a process for determining the reliability score for a creator of one or more items of social media content. Referring to FIG. 6, the figure illustrates a process for determining a reliability score for a creator of an item of social media content. In particular, the process begins with the reliability analysis module 220 identifying 605 the items of social media content generated by a particular user. Thereafter, the reliability analysis module 220 determines 610 the movement for the financial instruments associated with the identified items. In one embodiment, such a determination can be based on publicly available information for the financial instrument. For example, the movement of the financial instrument can be based on the trend of the average directional index for the instrument for a number of periods prior to and following the creation of the item associated with the instrument. Upon determining the movement the financial instruments, the reliability analysis module 220 compares 615 the movement of each financial instrument to the polarity or direction indicated by the item associated with the instrument.

Thereafter, the reliability analysis module 220 determines 620 a reliability score for the user that created the items of content. In one embodiment, if the financial instrument is determined to have moved in the same direction as indicated by the polarity or direction of a given item, the reliability analysis module 220 may compute a higher score for the user. If the financial instrument is determined to have moved in the opposite direction from the polarity, the reliability analysis module 220 may compute a lower score for the user.

In one embodiment, the reliability analysis module 220 may, alternatively or in addition to the steps 615 and 620 described above, use various metrics related to the user's performance in forecasting contests to determine the reliability score for the user. Such metrics may have been received from the contest system 960. In one embodiment, the reliability analysis module 220 may compute a higher score for users that have performed relatively well in the forecasting contests as indicated by the received metrics.

In one embodiment, the various rules and Bayesian algorithms described herein can be automatically and/or continuously refined as a result of the processing of the various social media content streams. In particular, as each item of social media content is processed, the data analysis engine can use information associated with the item (e.g., content included in the item, metadata, identification information) as well as the results of processing the item (e.g., determinations on whether the item is relevant, etc.) to iteratively improve the rules and Bayesian algorithms. For example, the data analysis engine 205 may receive feedback regarding the correctness of various relevancy determinations made by the engine. Based on this feedback, the data analysis engine 205 can improve the various rules and Bayesian algorithms such that the engine is able to more accurately determine the relevancy of items of social media content received thereafter.

Sentiment Determination

Figure 7:
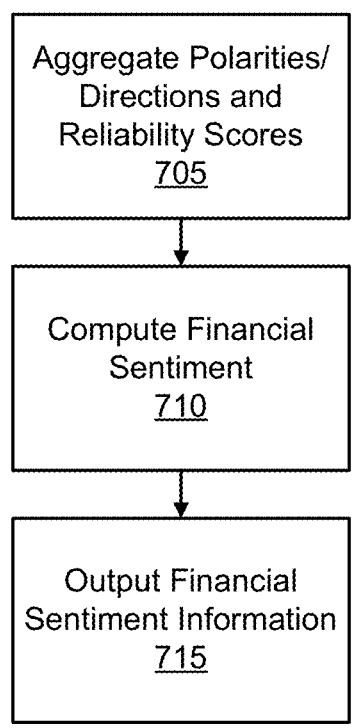
FIG. 7 illustrates one embodiment of a process for generating the sentiment for a financial instrument and providing sentiment information and other information to a user.

As discussed, the sentiment module 222 generates sentiment information for one or more financial instruments. The sentiment information can be indicative of the bullishness or bearishness of a particular financial instrument as indicated by the items of social media content processed by the data analysis engine 205. Referring to FIG. 7, a process for generating the sentiment for a financial instrument and providing sentiment information and other information to a user is shown. In FIG. 7, the sentiment module 222 aggregates 705 polarities/directions and reliability scores for each of items of the one or more financial instruments. The polarities/directions and reliability scores for each financial instrument may have been previously derived by processing one or more items of social media content associated with the financial instrument, as described previously with respect to FIGS. 3 through 7.

After aggregating the polarities/directions and reliability scores, the sentiment module 222 computes 710 the sentiment information for the instrument. In one embodiment, the sentiment module 222 can compute the sentiment information as a function of the polarities and/or directions indicated by items of social media content associated with the financial instrument and the reliability scores for the creators of the content. In the function, the weight of influence for each content item in the sentiment information may be affected by the reliability of the creator of the item. More specifically, the polarity and/or direction of a particular item may be given more weight in determining the sentiment information if the reliability of the creator of the item is relatively high. Illustratively, a first content item may indicate a positive polarity value for a financial instrument, and be associated with a reliability score of 0.5. A second content item may indicate a negative polarity value for the financial instrument, and be associated with a reliability score of 0.8. Because the reliability score for the second content item is higher than the first, the sentiment information may indicate that the financial instrument has an overall bearish sentiment.

In one embodiment, the weight of influence for each content item in the sentiment information may additionally be affected by the classification of the item. More specifically, certain classifications may be more indicative of the polarity of a content item. For example, content items assigned to the technical pattern category may be more indicative of polarity than content items assigned to other categories. As such, content items assigned to the technical pattern category may be given more weight in determining the sentiment information for a financial instrument.

After computing the sentiment information, the sentiment module 222 outputs 715 the information. In one embodiment, the sentiment module 222 may provide the sentiment information for display to a user via the user interface 240 (e.g., a dashboard, such as the STOCIAL.COM dashboard). In one embodiment, the determined sentiment information for a particular financial instrument may include a bar chart that provides a visual indication of the percentage of positive and negative polarities/directions indicated by one or more items of social media content, where the percentages are adjusted for the reliability scores and financial category classifications associated with the content items.

In the embodiment, the sentiment module 222 additionally provides, for display, one or more social media message packets to the user via the user interface 240. The social media message packets may be selected based on the social media message packet counts determined during the aforementioned cleaning process performed by the ingest module 210. In one embodiment, the social media message packets having the highest counts may be selected for each of various financial categories for one or more financial instruments. In some instances, the selected social media message packets can be arranged according to their associated financial categories. For example, a first social media message packet may be displayed in a section of the user interface for market pulse information. A second social media message packet may be displayed in a section of the user interface for technical pattern information.

Figure 8A:
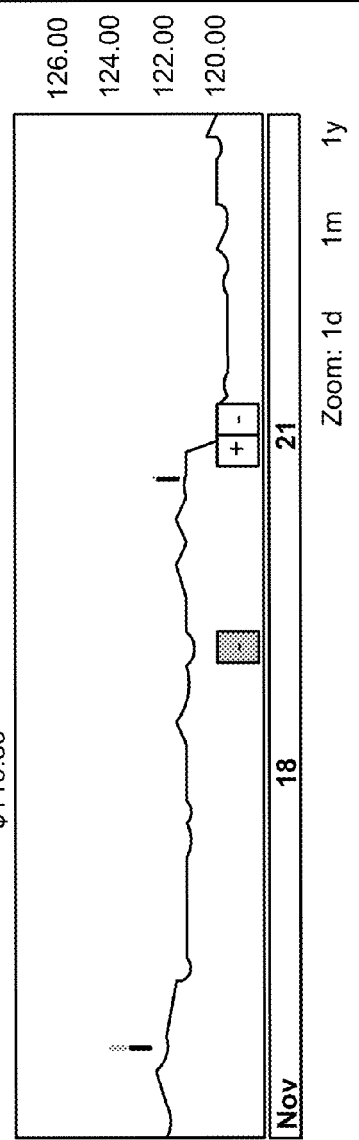

Referring to FIG. 8A, an embodiment of an exemplary user interface is shown. In the user interface, sentiment information is displayed for a number of different financial instruments. For example, the current sentiment information for the ticker symbol AAPL includes a bar chart 805 displayed next to the current price of AAPL ($119.89). In addition, various user configurable and movable widgets are shown for displaying the social media message packets of various social media content items. Each widget includes social media message packets of items associated with a particular category. For example, FIG. 8A shows the widgets 810, 815, and 820 that include the social media message packets of content items classified as technical, trades, and pulse. In one embodiment, the user interface can also include a configurable portfolio 825 that includes a set of user input ticker symbols. For each ticker symbol, the portfolio displays sentiment information for the symbol as well as the content of an item of social media content associated with the ticker symbol.

In another embodiment, an exemplary user interface may include one or more sections that provide organized information for a subject financial instrument. The sections may include an overview section, a social momentum section, a fundamentals section, an analyst estimates section, and/or a relative risk section.

Figure 8B:
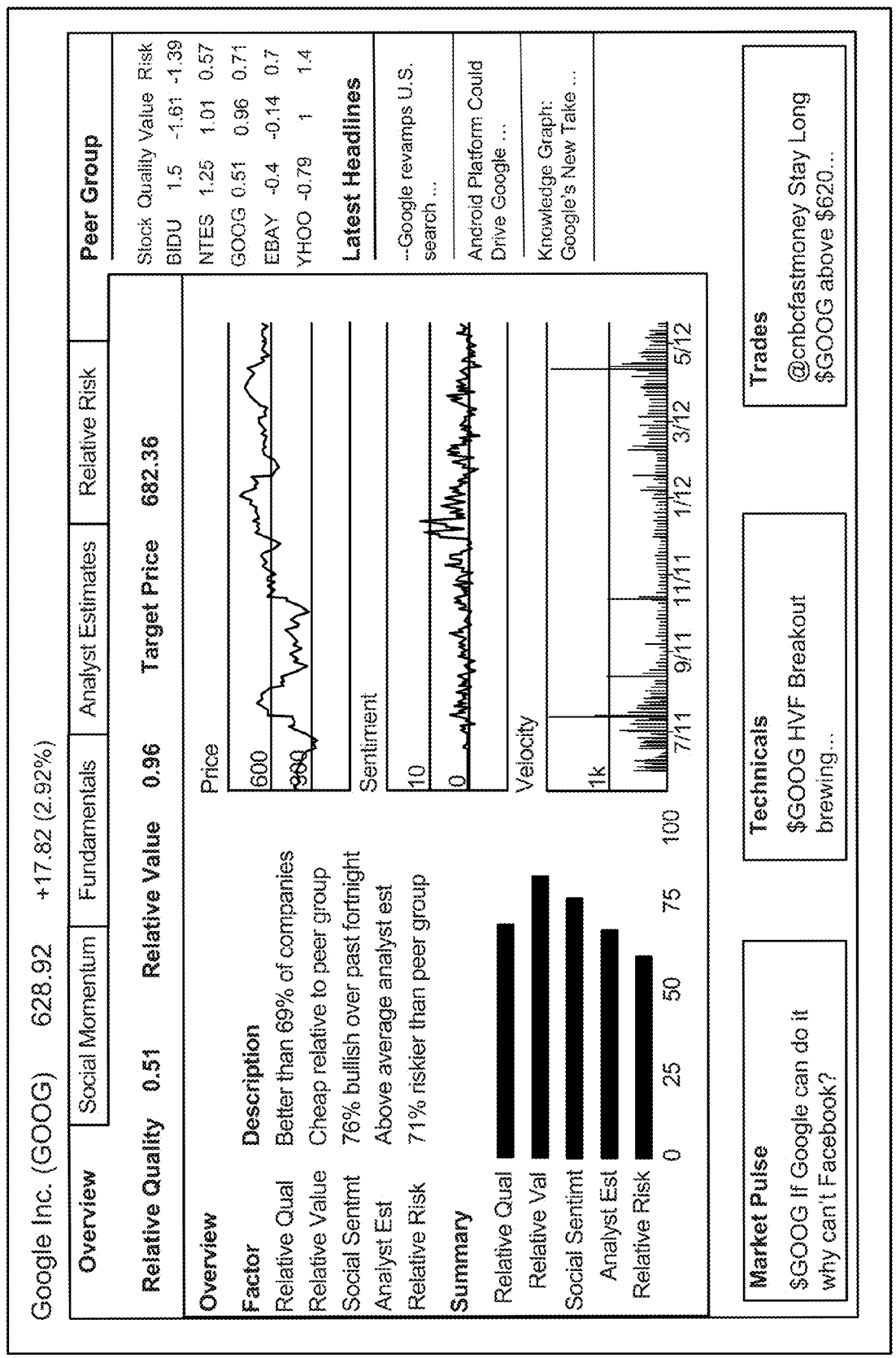

The overview section may provide general information regarding the subject financial instrument, such as relative quality information (e.g., data describing the quality of the financial instrument relative to others in the same peer group), relative value information (e.g., data describing the quality of the value of the financial instrument relative to others in the same peer group), financial sentiment information, analyst estimates information, and relative risk information. FIG. 8B illustrates an example of an overview section of a user interface.

Figure 8C:
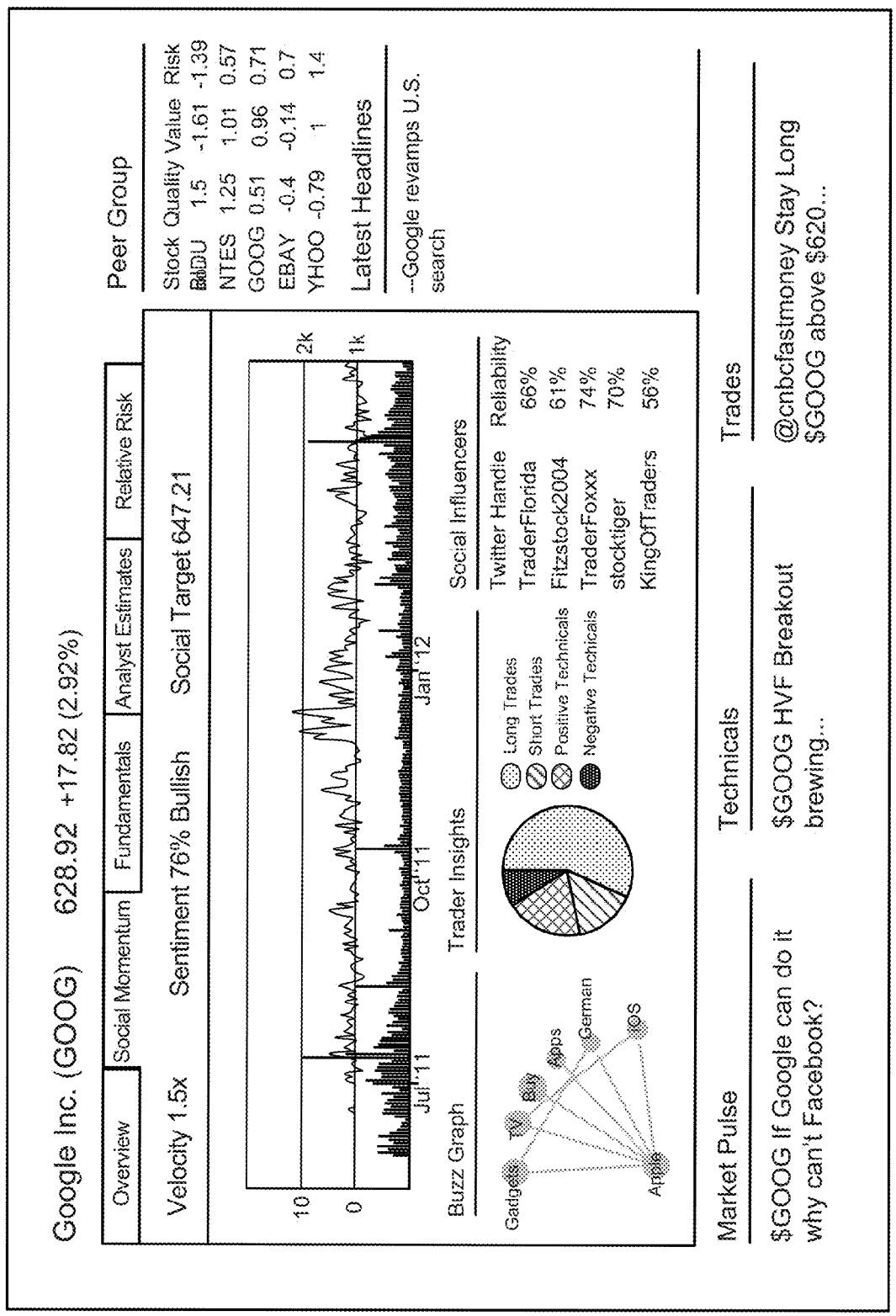
Figure 8F:

The social momentum section may provide information including data generated from items of social media content. The social momentum section may provide, for example, detailed financial sentiment information, information regarding influential (e.g., reliable) creators of items of social media content, etc. FIG. 8C illustrates an example of a social momentum section of a user interface. The fundamentals section may provide information including data regarding different financial metrics for the subject financial instrument (e.g., equity to debt metrics, cash flow to debt metrics, average ROE metrics, etc.). FIG. 8D illustrates an example of a fundamentals section of a user interface. The analyst estimates section may provide information provided by different analysts that is indicative of the future performance of the subject financial instrument. FIG. 8E illustrates an example of an analyst estimates section of a user interface. The relative risk section may include information indicating the factors (e.g., intrinsic or macroeconomic factors) that may influence the performance of the subject financial instrument. FIG. 8F illustrates an example of a relative risk section of a user interface. In one embodiment, the information provided by the user interface may be presented in a suitable manner. For example, the information may be presented as textual information, in pie charts, in bar charts, etc.

In one embodiment, the sentiment module 222 may output the sentiment information, social media content items, item classifications and/or other information accessible via an application programming interface (API). In the embodiment, third party entities (e.g., Hedge Funds, Bloomberg, Reuters, CapIQ, etc.) may access the API in order to retrieve the sentiment information, social media content items, item classifications, and/or other information. The third party entities may thereafter present the information to their users and/or perform further processing on the information.

Embodiments, by classifying social media content and presenting sentiment information, can enable users to quickly and precisely determine the sentiment for a particular financial instrument, group of financial instruments, financial sector, or financial market for a given category. As a result, users can more rapidly and soundly make investment decisions.

System for Holding Forecasting Contests

Figure 9:
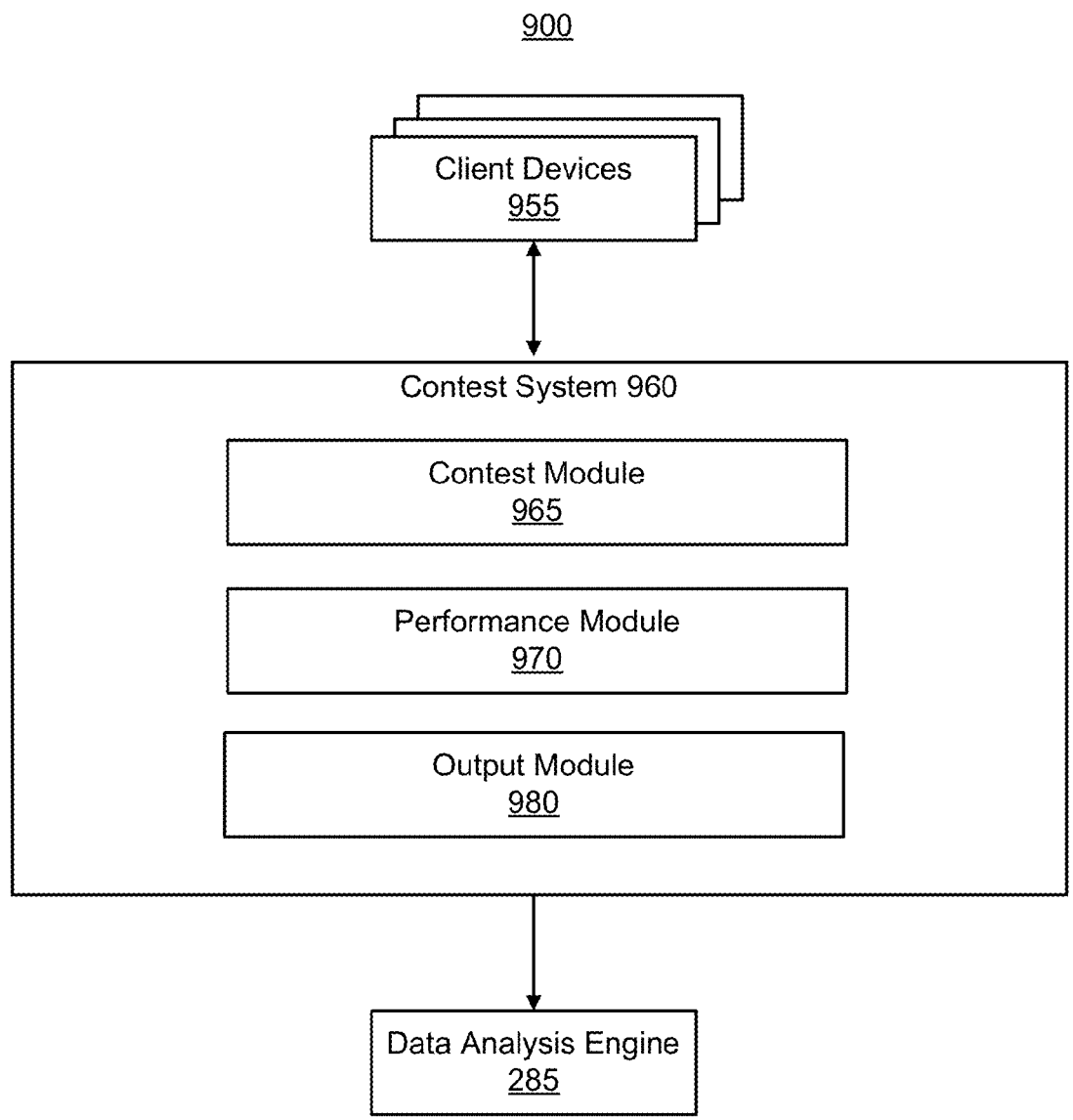
FIG. 9 illustrates one embodiment of various components for a system configured to conduct forecasting contests.

Turning now to FIG. 9, it illustrates various components for a system 900 configured to conduct forecasting contests and to provide information based on the contests usable for determining the financial sentiment of one or more financial instruments. The system 900 may be configured to execute described processes within the computer system 100. As shown in FIG. 9, the system 900 includes one or more client devices 955 and a contest system 960.

The client devices 955 are devices usable by users to enter forecasting contests. In particular, a client device 955 can present a user interface (e.g., a graphical user interface of a website, etc.) that includes a list of forecasting contests in which its user may enter. A client device 955 may additionally receive an indication from its user of a contest that the user wishes to enter. In conjunction with the indication, the client device 955 may receive one or more picks for the selected contest. Each received pick may provide an estimate or guess as to the future performance of a subject financial instrument of the contest.

Turning to the contest system 960, it supports the determination of sentiment for various financial instruments by conducting forecasting contests. More specifically, the contest system 960 initiates forecasting contests that enable various uses to make picks regarding the future performance of a number of financial instruments. Upon receiving the picks, the contest system 960 evaluates the picks based on real market data. The picks and/or any data related to the forecasting contests can be provided to the data analysis engine 285. Such data may be used by the data analysis engine 285 to determine the financial sentiment of the financial instruments. For example, the picks and/or any relevant data (e.g., user performance metrics) may be processed by the data analysis engine 285 according to the processes shown in FIGS. 5 through 7. In one embodiment, the contest system 960 may be a system operated by STOCIAL.COM. Referring again to FIG. 9, the contest system 960 includes three modules: a contest module 965, a performance module 970, and an output module 980.

Contest Forecasting

In one embodiment, the contest module 965 facilitates a number of forecasting contests. For example, the contest module 965 may facilitate a contest where users can provide picks that forecast the performance for a technology stock, e.g., GOOGLE stock, AMAZON stock, YAHOO.COM stock, etc. In one embodiment, the contest module 965 initiates a contest by first defining specific parameters for the contest. In defining the contest's parameters, the contest module 965 may specify a subject for the contest. For example, the contest module 965 may specify that a contest pertain to a certain market, sector, sub-sector, industry, sub-industry, group of financial instruments, or a single financial instrument. The contest module 965 can additionally specify the term or duration of the contest. For example, the contest module 965 can indicate that the contest last any number of hours, days, weeks, or months. The contest module 965 can moreover specify the type of picks that can be received from users. In particular, the contest module 965 can specify whether the contest allows open and/or closed type picks to be received from users.

An open type pick may refer to pick in which a user provides either a buy price or a short sell price depending on the strategy of the user. More specifically, if a user selects a long trade strategy, the user provides a buy price for the subject of the contest. If a user selects a short trade strategy, the user provides a short sell price for the subject of the contest. A closed type pick may refer to a pick in which a user provides either 1) a buy price and a sell price or 2) a short sell price and a buy to cover price depending on the strategy of the user. More specifically, if a user selects a long trade strategy, the user provides a buy price and a sell price. If a user selects a short trade strategy, the user provides a short sell price and a buy to cover price.

In one embodiment, the contest module 965 may additionally define a reward to be provided to the winner(s) of the contest. The reward can be a physical item, a virtual item, a gift card, a monetary award, a discount on a purchase, etc. The contest module 965 may additionally specify any advertisements that are to be displayed in conjunction with the contest. For example, the advertisements may be displayed while a user makes a pick associated with the contest. The advertisements may be received from any suitable source, such as various third party advertisers.

In one embodiment, the parameters of a contest may be defined automatically by the contest module 965, by a system operator of the contest system 960, or received from a third party sponsor. For example, a third party sponsor may specify that a semiconductor sector be the subject of a contest. The third party sponsor may further specify that the contest is to last one week and that any picks are to be of the open type. The third party sponsor may additionally specify the reward for the contest, and any advertisements to be presented.

After initiation of the contest, the contest module 965 receives picks from one or more users via the client devices 955. In some instances, picks for a contest may be received directly from users via their client devices 955. For example, the contest module 965 may provide a contest website accessible by various users via the users' client devices 955. The users may in turn directly send picks to the contest module 965 by using their client devices 955. In other instances, picks for a contest may be received from third party entities. More specifically, third party entities may provide contest widgets on their websites. Users of the websites may enter picks into the widgets using their client devices 955. Upon receiving the picks, the third party entities may send the picks to the contest module 965.

After receiving the picks, the contest module 965 monitors the picks over the duration of the contest. Monitoring of the picks can, in one embodiment, be based on real market data continuously or periodically received from a suitable source, such as an external financial data provider. The received market data may include up to date financial instrument prices and/or other relevant information. In monitoring the picks, the contest module 965 continuously or periodically determines whether any of the picks have completed. When a pick is determined to be completed, metrics for the pick can be determined for purposes of the contest. Any picks that are not determined to be completed during the duration of the contest may be marked as incomplete, and disqualified from consideration in the contest.

As discussed, contests can either allow open type picks or closed type picks to be made by its users. The following sections describe the manner in which each type of pick is determined to be completed. The sections additionally describe the manner in which a net gain metric for each type of pick is calculated.

Open Type Picks

To identify whether any picks of the open type have completed, the contest module 965 determines whether those picks having a long trade strategy have executed based on their buy prices and on the current price of the subject financial instrument. As an example, a pick may be completed if the current price of the subject financial instrument is less than or equal to the pick's buy price. The contest module 965 additionally determines whether those picks having a short trade strategy have executed based on their short sell prices and on the current price of the subject financial instrument. As an example, a pick may be completed if the current price of the subject financial instrument is greater than or equal to the pick's short sell price.

After monitoring of the picks for the duration of the contest, the contest module 965 determines the net gain metric of each pick. In one embodiment, the net gain metric for a pick having a long trade strategy may be determined using the following equation:

Net Gain=(Real Market Price at Contest End−Buy Price)/(Buy Price)

Likewise, the net gain metric for a pick having a short trade strategy may be determined using the following equation:

Net Gain=(Short Sell Price−Real Market Price at Contest End)/(Real Market Price at Contest End)

Closed Type Picks

To identify whether any picks of the closed type have completed, the contest module 965 determines whether each of those picks having a long trade strategy have executed both the buy and sell portions of the pick. If both portions have executed, the pick is determined to be completed. The contest module 965 additionally determines whether each of those picks having a short trade strategy have executed both the short sell and cover to buy portions of the pick. If both portions have executed, the pick is determined to be completed.

After monitoring of the picks for the duration of the contest, the contest module 965 determines the net gain metric of each pick. In one embodiment, the net gain metric for a pick having a long trade strategy may be determined using the following equation:

Net Gain=(Sell Price−Buy Price)/(Buy Price)

Likewise, the net gain metric for a pick having a short trade strategy may be determined using the following equation:

Net Gain=(Short Sell Price−Cover to Buy Price)/(Cover to Buy Price).

After determining the net gain metric for the contest, the winner(s) for the contest is determined. The winner(s) of the contest may have had the pick with the highest net gain metric for the contest. After determining the winner(s), the reward for the contest is provided to the winner(s). In some instances, the reward may be electronically provided to the winner(s). For example, an electronic gift card may be emailed to the winner(s). In other instances, the reward may be physically provided to the winner(s). For example, a particular product may be mailed to the winner(s).

In one embodiment, the contest module 965 may provide various feeds to users. The feeds may indicate the status and other information for various picks made by users for one or more forecasting contests. In one embodiment, each feed may include various items, where each item provides information regarding a particular pick. More specifically, each item in a feed may indicate a user who made a particular pick, the contest with which the pick is associated, and the status of the pick. In one embodiment, users may be provided with a global pick feed. Such a feed may provide information regarding the picks across all of the forecasting contests being conducted by the contest module 965. In one embodiment, users may be provided with a global contest pick feed. Such a feed may provide information regarding the picks for a particular forecasting contest. In still another embodiment, users may be provided with a financial instrument pick feed. Such a feed may provide information regarding the picks made with respect to a specific financial instrument. In yet another embodiment, users may be provided with a market pick feed. Such a feed may provide information regarding the picks made with respect to a particular market, sector, sub-sector, industry, sub-industry, and/or group of financial instruments.

In one embodiment, the contest module 965 may enable users to generate content with respect to certain forecasting contests, picks, and/or financial instruments. For example, users may comment on, like, and/or dislike particular contests, picks, and/or financial instruments. As used herein, a like or dislike may refer to an indication provided by a user as to the user's perception of particular contest, pick, or financial instrument. For example, a like indication from a user for a pick may indicate that the user has an overall positive perception of the pick. Such information may be posted to a website of the contest system 960 so that various users can view the comments. In one embodiment, the contest module 965 may permit users to follow other users. If a particular user is followed by a "following user", the contest module 965 can provide the following user with up to date information regarding the user's picks, entered contests, contest performance, etc.

User Performance Determination

The performance module 970 determines the overall performance for a set of users of the contest system 960. More specifically, the performance module 970 can compute various metrics for each of the set of users. Based on a user's overall performance, the performance module 970 determines the external areas of expertise, external reputations, and internal ranks for the user.

In one embodiment, the performance module 970 may compute various overall net gain metrics for each of the set of users. The overall net gain metrics may be based on the various picks made by the each user across various forecasting contests. In one embodiment, the overall net gain metric for a user may be computed with respect to a particular scope, such as a specific financial instrument scope, a group of financial instruments scope, a sector scope, a sub-sector scope, an industry scope, a sub-industry scope, and/or an entire market scope. For example, an overall net gain metric may be computed for a user with respect to each of a GOOGLE INC. stock scope, a technology sector scope, and an entire market scope. Each overall net gain metric may be based on those picks related to the metric's specific scope. Illustratively, an overall net gain metric for the technology sector scope may be based on the net gain metrics for a user's picks related to the technology sector. In one embodiment, the overall net gain metric for a particular scope may be calculated by summing the net gain metrics for each of the picks associated with the particular scope.

In addition, to determining the overall net gain metric for a user, the performance module 970 additionally determines a number of completed picks for the user for each of the aforementioned scopes. In one embodiment, the number of completed picks may be weighted or adjusted according to the duration of the contests for the picks. Based on the adjusted number for each scope, the user may be assigned a particular completed picks level for the scope. For example, a user with a relatively high number of completed picks for GOOGLE INC.'s stock may be assigned to have a level of 1. In contrast, a user with a relatively low number of completed picks for GOOGLE INC.'s stock may be assigned to a level of 4 or higher.

The performance module 970 further determines a level of clout for each user for each scope. The level of clout for a particular user for a certain scope is determined based on (1) the number of likes by other users for the user and/or his or her picks associated with the scope and (2) the number of followers for the user. As an example, a user may have entered a pick related to the stock of a particular operating systems company. The pick may provide a sell price for the stock. The user may have also made a comment regarding the reason he or she chose the sell price. Such a comment may be "liked" by other users. The number of likes generated by the comment may be used to calculate the level of clout for the user.

The performance module 970 moreover determines the accuracy for each user for each scope. The accuracy for a user may be determined using the following equation:

Accuracy for a scope=(Number of Complete Picks for the Scope)/(Number of Total Picks for the Scope)

Based on the overall net gain, completed picks, clout and accuracy metrics, the performance module 970 determines the external areas of expertise, external reputations, and internal ranks for each user for each scope. As used herein, an external area of expertise for a user may be an area in which the user has performed well in contests related to the area. As used herein, an area can be of any suitable scope. For example, an area can have a scope that encompasses a single financial instrument, a group of financial instruments, a sector, a sub-sector, an industry, a sub-industry, or an entire market. Illustratively, a user may be determined to have an expertise in the semiconductor area because he or she has performed relatively well in contests involving stocks related to the semiconductor sector. In one embodiment, the external area of expertise for a user may be determined based on the net gain metrics for the user for his or her picks. More specifically, the performance module 970 may identify a user who has obtained an overall high net gain metric with respect to other users for a particular area as having expertise in the area.

Figure 10:
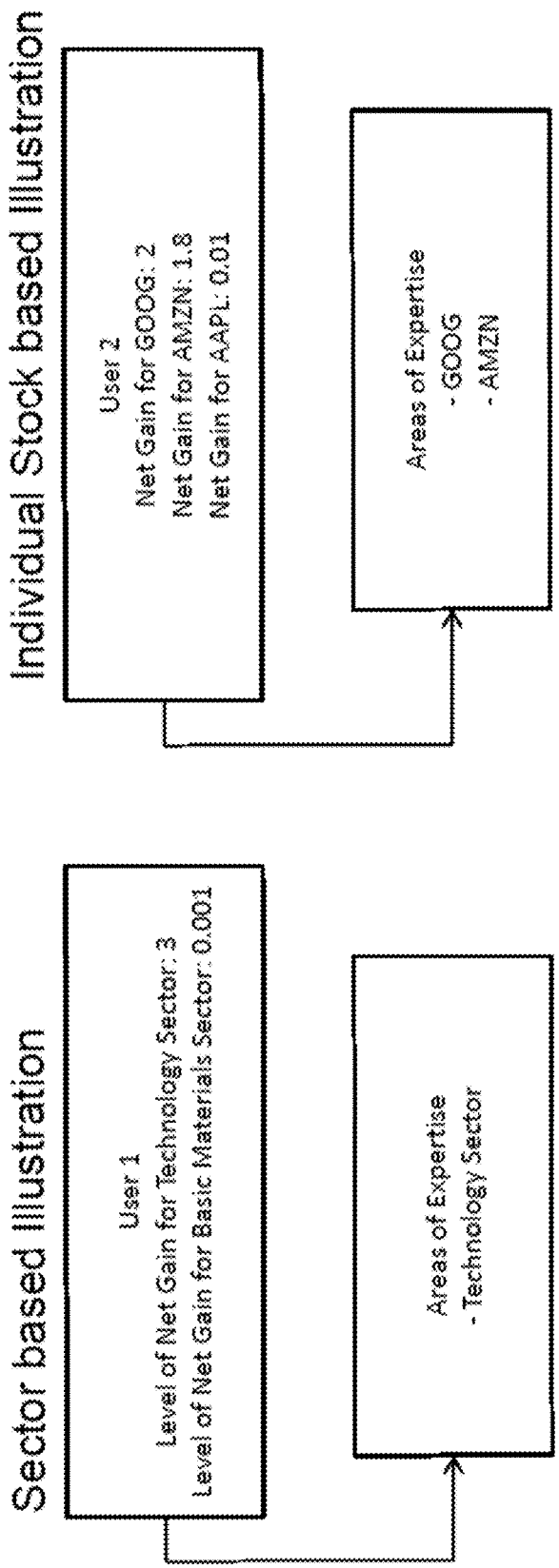
FIG. 10 illustrates one embodiment of the determination of the external areas of expertise for users.

Referring to FIG. 10, the figure illustrates the determination of the areas of expertise for various users. More specifically, FIG. 10 shows a user 1 as having a high overall net gain metric for the technology sector, and a low overall net gain metric for the basic materials sector. As a result, user 1 is determined to have an area of expertise in the technology sector. As also shown in FIG. 10, a user 2 is shown as having high overall net gain metrics for the stocks for GOOGLE INC. and AMAZON.COM INC. User 2 is also shown as having a low overall net gain metric for the stock for APPLE INC. As such, user 2 is determined to have areas of expertise in the stocks for GOOGLE INC and AMAZON.COM INC.

As used herein, an external reputation for a user may be the determined standing for the user among the other users of the contest system 965 for a particular scope. More specifically, a user may have a relatively high external reputation for a particular scope if other users of the contest system 965 have a high regard for the user for the scope. In one embodiment, the external reputation for a user may be based on the level of completed picks and the level of clout for the user across the contests in which the user has entered. More specifically, the better a user's level of completed picks and level of clout for a particular scope, the better the user's external reputation for the scope. In one embodiment, a user's determined external reputation may be measured in levels. In particular, users with high external reputations may be assigned to a level of 1. Users with low external reputations may be assigned to a level of 4 or higher. Referring to FIG. 11, it shows the manner in which external reputation is associated with levels of clout and completed picks. More specifically, FIG. 11 shows that users with better external reputations are associated with better levels of clout and completed picks.

As used herein, the internal rank for a user may indicate an overall ranking for the user in the contest system 960 for a particular scope. The ranking may be relative to other users of the contest system. In one embodiment, an internal rank may be based on the overall net gain metric, level of clout, and accuracy for the user for a particular scope. Each of the aforementioned overall net gain, clout, and accuracy metrics may be combined, factored, normalized, and/or weighted in any suitable manner to derive the internal rank for a user. In one embodiment, the calculation of an internal rank may be based on various probability density functions analysis. Referring to FIG. 12, it shows the manner in which internal rank is associated with a net gain metric, level of clout, and level of accuracy. More specifically, FIG. 12 shows that users with better internal ranks have better net gain metrics, levels of clout, and levels of accuracy.

In one embodiment, based on a user's external areas of expertise, external reputations, and internal ranks, the performance module 970 may identify job opportunities for the user. For example, the performance module 970 may determine that a user has a relatively high external area of expertise in the biotechnology area. Responsive to such a determination, the performance module 970 may identify job opportunities that require users to have an expertise in analyzing and predicting the performance of financial instruments related to the biotechnology area. The performance module 970 may receive information regarding the job opportunities from any suitable source. In one embodiment, the performance module 970 may receive the information from a job opportunities aggregator, such as MONSTER.COM. In other embodiments, the performance module 970 may receive the information directly from employers. In some embodiments, the sources of the job opportunities may also be the third party sponsors for one or more contests.

Figure 13:
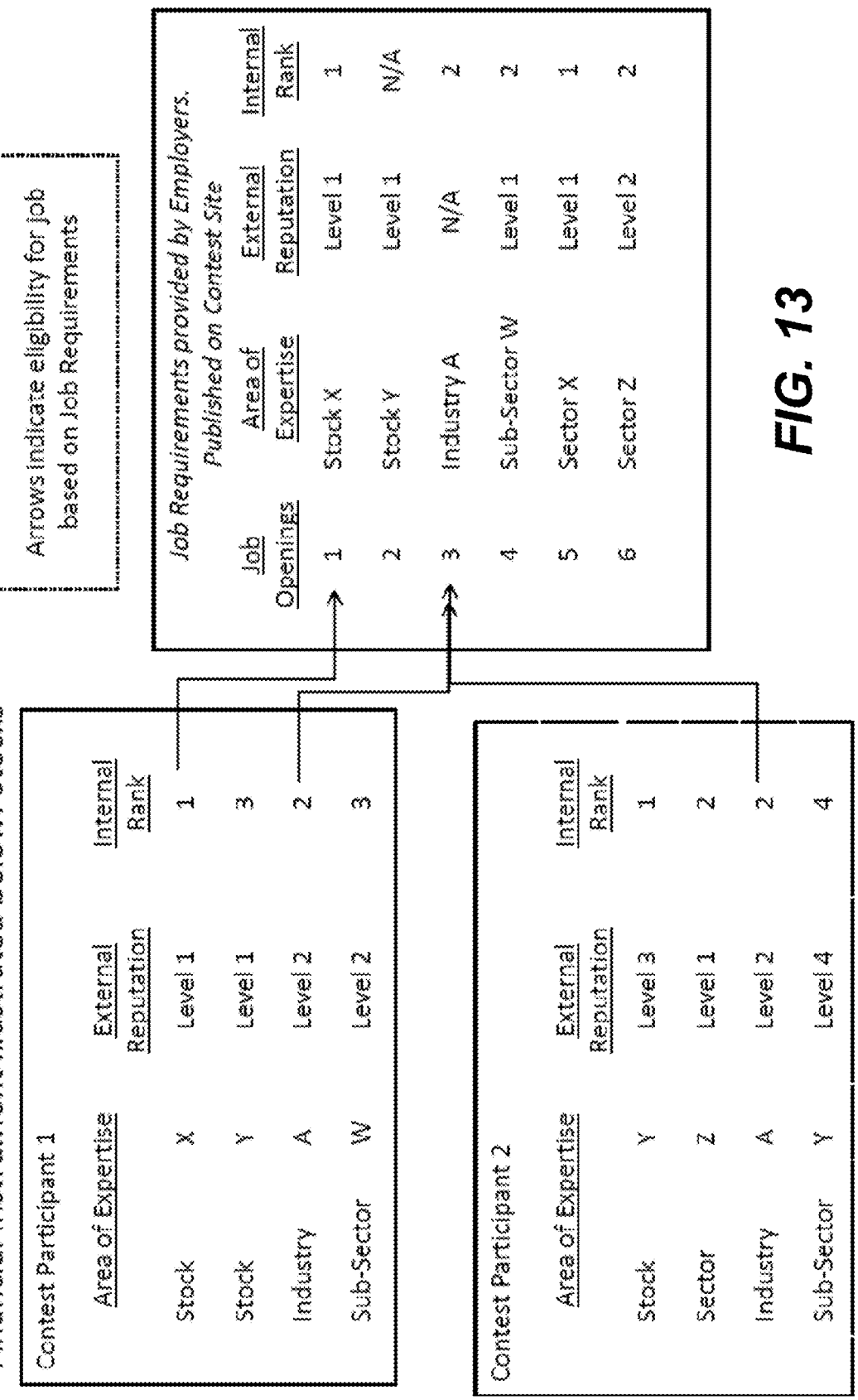
FIG. 13 illustrates one embodiment of the matching of job opportunities to certain users.
Figure 14:
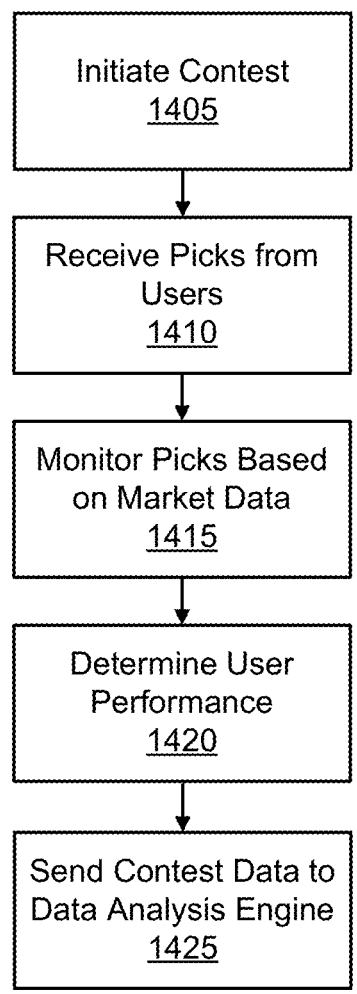
FIG. 14 illustrates on embodiment of a process for conducting a forecasting contest.

In one embodiment, the job opportunities received by the performance module 970 may specify criteria that must be met in order for a user to be presented with the job opportunities. For example, a job opportunity may require that a user have expertise in a particular area, have an external reputation of a specific level, and also have a certain internal rank. Illustratively, a job opportunity may require that a user have expertise in the area of biotechnology, have an external reputation of level 2 or better, and also have an internal rank of 10 or better. FIG. 13 illustrates the manner in which job opportunities are matched to certain users.

Output of Data for Supporting Determination of Financial Sentiment

The output module 980 provides data (e.g., a filtered content streams) to the data analysis engine 285 for supporting the determination of financial sentiment for one or more financial instruments. In one embodiment, the output module 980 provides information regarding the picks (e.g., transaction content items) made by various users. The output module 980 additionally provides user performance metrics for the users. For example, the output module 980 may provide the external areas of expertise, external reputations, and internal ranks for various users.

Process for Holding a Forecasting Contest

The process begins 1405 by initiating a forecasting contest for a subject financial instrument. Thereafter, the process receives 1410 picks for the contest from one or more users. After receiving the picks, the process monitors 1415 the picks based on real market data to determine whether any of the picks have completed. After expiration of the contest, the process determines 1420 an overall performance for each of the users. In particular, the process may compute performance metrics for the users. Based on the performance metrics for the contest, the process can compute or update each user's overall performance metrics. Thereafter, the process sends 1425 data regarding any contest picks and performance metrics to the data analysis engine 285. The data analysis engine 285 may use such data to determine the financial sentiment for one or more financial instruments.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 9. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system e.g., 100) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors 102, not only residing within a single machine, but deployed across a number of machines. In some example embodiments, the one or more processors 102 or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for systems and processes for classifying social media, deriving sentiment and conducting forecasting contests through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
   initiating, by a computer system, a forecasting contest based at least in part on a financial instrument;
   receiving, by the computer system, a plurality of picks for the forecasting contest from one or more users;
   monitoring, by the computer system, the plurality of picks based at least in part on market data, the market data including pricing information for the financial instrument;
   determining, by the computer system, user performance metrics for the one or more users based on the monitoring, the determination of the user performance metrics comprising:
      receiving, by the computer system from a first user, a positive indication for a second user, wherein the second user generated a pick from the plurality of picks for the forecasting contest;
      identifying, by the computer system, a number of followers of the second user; and
      generating, by the computer system, the user performance metrics for the one or more users based at least in part on (1) the positive indication for the second user received from the first user and (2) the identified number of followers of the second user;
   receiving, by the computer system, a social media content item describing the financial instrument from a third-party social media channel;
   determining, by the computer system, a financial classification for the social media content item received from the third-party social media channel based at least in part on one or more financial terms included in the content item;
   determining, by the computer system, a polarity of the financial instrument based on the determined classification for the social media content item received from the third-party social media channel; and
   determining, by the computer system, financial sentiment for the financial instrument using (1) the received picks, (2) the determined user performance metrics, and (3) the determined polarity of the financial instrument determined based on the determined classification for the social media content item received from the third-party social media channel.

2. The computer-implemented method of claim 1, wherein at least some of the plurality of picks each specifies either a buy price for the financial instrument or a short sell price for the financial instrument.

3. The computer-implemented method of claim 1, wherein at least some of the plurality of picks each specifies either (1) a buy price and a sell price, or (2) a short sell price and a buy to cover price.

4. The computer-implemented method of claim 1, wherein monitoring the plurality of picks comprises:
   determining that at least one pick has met a price for the financial instrument in the market data; and
   marking the at least one pick as completed based on the determination that the at least one pick has met the price for the financial instrument in the market data.

5. The computer-implemented method of claim 1, wherein determining user performance metrics for the one or more users comprises:
   computing a net gain metric for a pick associated with a third user of the one or more users based at least in part on a price for the financial instrument in the market data;
   identifying a particular financial area with which the financial instrument is associated; and
   determining that the third user has an expertise in the particular financial area based at least in part on the computed net gain metric.

6. The computer-implemented method of claim 5, wherein the financial area includes a scope encompassing a financial market, sector of a financial market, sub-sector of a financial market, industry, sub-industry, a group of financial instruments, or a single financial instrument.

7. A system including:
   a non-transitory computer-readable storage medium storing executable computer program instructions comprising instructions for:
      initiating a forecasting contest based at least in part on a financial instrument;
      receiving a plurality of picks for the forecasting contest from one or more users;
      monitoring the plurality of picks based at least in part on market data, the market data including pricing information for the financial instrument;
      determining user performance metrics for the one or more users based on the monitoring, the determination of the user performance metrics comprising:
         receiving, from a first user, a positive indication for a second user, wherein the second user generated a pick from the plurality of picks for the forecasting contest;
         identifying a number of followers of the second user; and
         generating the user performance metrics for the one or more users based at least in part on (1) the positive indication for the second user received from the first user and (2) the identified number of followers of the second user;
      receiving a social media content item describing the financial instrument from a third-party social media channel;
      determining a financial classification for the social media content item received from the third-party social media channel based at least in part on one or more financial terms included in the content item;
      determining a polarity of the financial instrument based on the determined classification for the social media content item received from the third-party social media channel; and
      determining financial sentiment for the financial instrument using (1) the received picks, (2) the determined user performance metrics, and (3) the determined polarity of the financial instrument determined based on the determined classification for the social media content item received from the third-party social media channel; and a processor for executing the computer program instructions.

8. The system of claim 7, wherein at least some of the plurality of picks each specifies either a buy price for the financial instrument or a short sell price for the financial instrument.

9. The system of claim 7, wherein at least some of the plurality of picks each specifies either (1) a buy price and a sell price, or (2) a short sell price and a buy to cover price.

10. The system of claim 7, wherein the instructions for monitoring the plurality of picks comprises instructions for:
  determining that at least one pick has met a price for the financial instrument in the market data; and
  marking the at least one pick as completed based on the determination that the at least one pick has met the price for the financial instrument in the market data.

11. The system of claim 7, wherein the instructions for determining user performance metrics for the one or more users comprises instructions for:
  computing a net gain metric for a pick associated with a third user of the one or more users based at least in part on a price for the financial instrument in the market data;
  identifying a particular financial area with which the financial instrument is associated; and
  determining that the third user has an expertise in the particular financial area based at least in part on the computed net gain metric.

12. The system of claim 11, wherein the financial area includes a scope encompassing a financial market, sector of a financial market, sub-sector of a financial market, industry, sub-industry, a group of financial instruments, or a single financial instrument.

13. A non-transitory computer readable medium configured to store instructions, the instructions when executed by a processor cause the processor to:
  initiate a forecasting contest based at least in part on a financial instrument;
  receive a plurality of picks for the forecasting contest from one or more users;
  monitor the plurality of picks based at least in part on market data, the market data including pricing information for the financial instrument;
  determine user performance metrics for the one or more users based on the monitoring, wherein the instructions that cause the processor to determine the user performance metrics cause the processor to:
    receive, from a first user, a positive indication for a second user, wherein the second user generated a pick from the plurality of picks for the forecasting contest;
    identify a number of followers of the second user; and
    generate the user performance metrics for the one or more users based at least in part on (1) the positive indication for the second user received from the first user and (2) the identified number of followers of the second user;
  receive a social media content item describing the financial instrument from a third-party social media channel;
  determine a financial classification for the social media content item received from the third-party social media channel based at least in part on one or more financial terms included in the content item;
  determine a polarity of the financial instrument based on the determined classification for the social media content item received from the third-party social media channel; and
  determine financial sentiment for the financial instrument using (1) the received picks, (2) the determined user performance metrics, and (3) the determined polarity of the financial instrument determined based on the determined classification for the social media content item received from the third-party social media channel.

14. The computer readable medium of claim 13, wherein at least some of the plurality of picks each specifies either a buy price for the financial instrument or a short sell price for the financial instrument.

15. The computer readable medium of claim 13, wherein at least some of the plurality of picks each specifies either (1) a buy price and a sell price, or (2) a short sell price and a buy to cover price.

16. The computer readable medium of claim 13, wherein the instructions that cause the processor to determine user performance metrics for the one or more users cause the processor to:
  compute a net gain metric for a pick associated with a third user of the one or more users based at least in part on a price for the financial instrument in the market data;
  identify a particular financial area with which the financial instrument is associated; and
  determine that the third user has an expertise in the particular financial area based at least in part on the computed net gain metric.

17. The computer readable medium of claim 16, wherein the financial area includes a scope encompassing a financial market, sector of a financial market, sub-sector of a financial market, industry, sub-industry, a group of financial instruments, or a single financial instrument.

* * * * *